Figure 1:
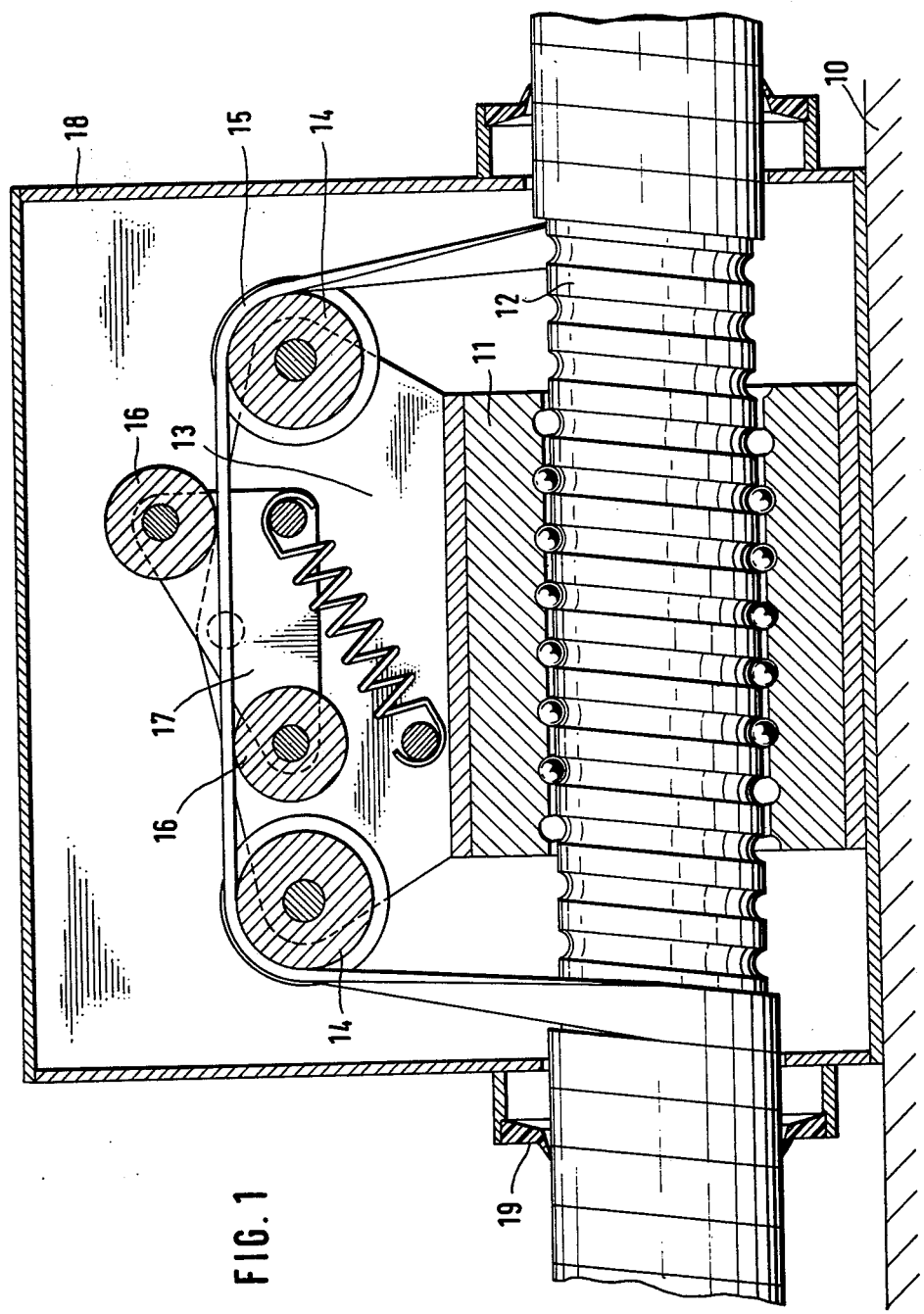

United States Patent [19]
Jung

[11] 4,085,625
[45] Apr. 25, 1978

[54] PROTECTIVE DEVICES FOR THREADED DRIVE SHAFTS

[76] Inventor: Werner Jung, Friedhof strasse 21, D-4050 Monchengladbach, Germany

[21] Appl. No.: 729,824

[22] Filed: Oct. 5, 1976

[30] Foreign Application Priority Data

Oct. 21, 1975 Germany .............................. 2546988

[51] Int. Cl.² ............................................. F16H 27/02
[52] U.S. Cl. .................... 74/89.22; 90/11 R
[58] Field of Search ....................................... 74/89.22

[56] References Cited
U.S. PATENT DOCUMENTS

| 3,044,312 | 7/1962 | Hall et al. | 74/89.22 |
| 3,824,905 | 7/1974 | Jablonsky | 74/89.15 |
| 3,866,481 | 2/1975 | Fuchs | 74/89.15 |

Primary Examiner—Benjamin W. Wyche
Assistant Examiner—Wesley S. Ratliff, Jr.
Attorney, Agent, or Firm—Charles W. Helzer

[57] ABSTRACT

A protective device is provided for the threaded shaft of a machine in which the shaft extends between relatively fixed and movable machine parts in respectively rotary and driving connections. The device comprises a belt which is fixed at one end to the shaft near the fixed machine part, wound round the shaft at the same pitch as the shaft thread, and passed to a rotary member mounted on the movable member. If the shaft is only exposed up to the machine movable part, the rotary member is spring-loaded or driven to serve as a take-up/supply spool. If the shaft continues beyond the movable part, the belt is wound around the remainder of the shaft and connected at its other end to the shaft.

10 Claims, 4 Drawing Figures

PROTECTIVE DEVICES FOR THREADED DRIVE SHAFTS

Threaded drive shafts are employed in machines in the most varied fields of application. A common example is that of a leadscrew in a machine tool such as a lathe.

The factors which can affect the useful life of such a shaft include, among other things, the extent to which the shaft can be kept free of foreign matter such as dust and metal swarf or waste, and also the extent to which the removal of lubricant by extraneous liquid can be avoided.

Various proposals have been made for taking account of these factors by covering the shaft with a protective device, but this is not a straightforward matter because the shaft obviously extends between relatively fixed and movable parts of the machine and is of a variable length between these parts. Indeed the shaft may be exposed on both sides of the movable part to give rise to two variable lengths requiring protection. For this reason the prior proposals accordingly include adjustable devices such as telescopic tubes, helical spring arrangements, and bellows.

However, these proposals suffer themselves from disadvantages. The relevant devices often have a large diameter, take up too much room on the machine, and may require support at one or more locations between the relevant machine parts. The incidence of such disadvantages clearly increases with longer shafts. Also, in so far as the protective devices themselves are subject to wear and replacement, a disadvantage arises in that significant dismantling, including disconnection of the shaft, is necessary.

An object of the present invention is to improve this situation and to this end the invention provides a protective device for a machine having relatively fixed and movable parts with a threaded shaft extending therebetween and connected thereto in respective rotary and driving engagement, said device comprising a belt connected at one end to said shaft adjacent said fixed machine part, wound around said shaft at the same pitch as the shaft thread to a location adjacent said movable machine part, and then passed around a rotary member mounted on said movable machine member.

Figure 2:
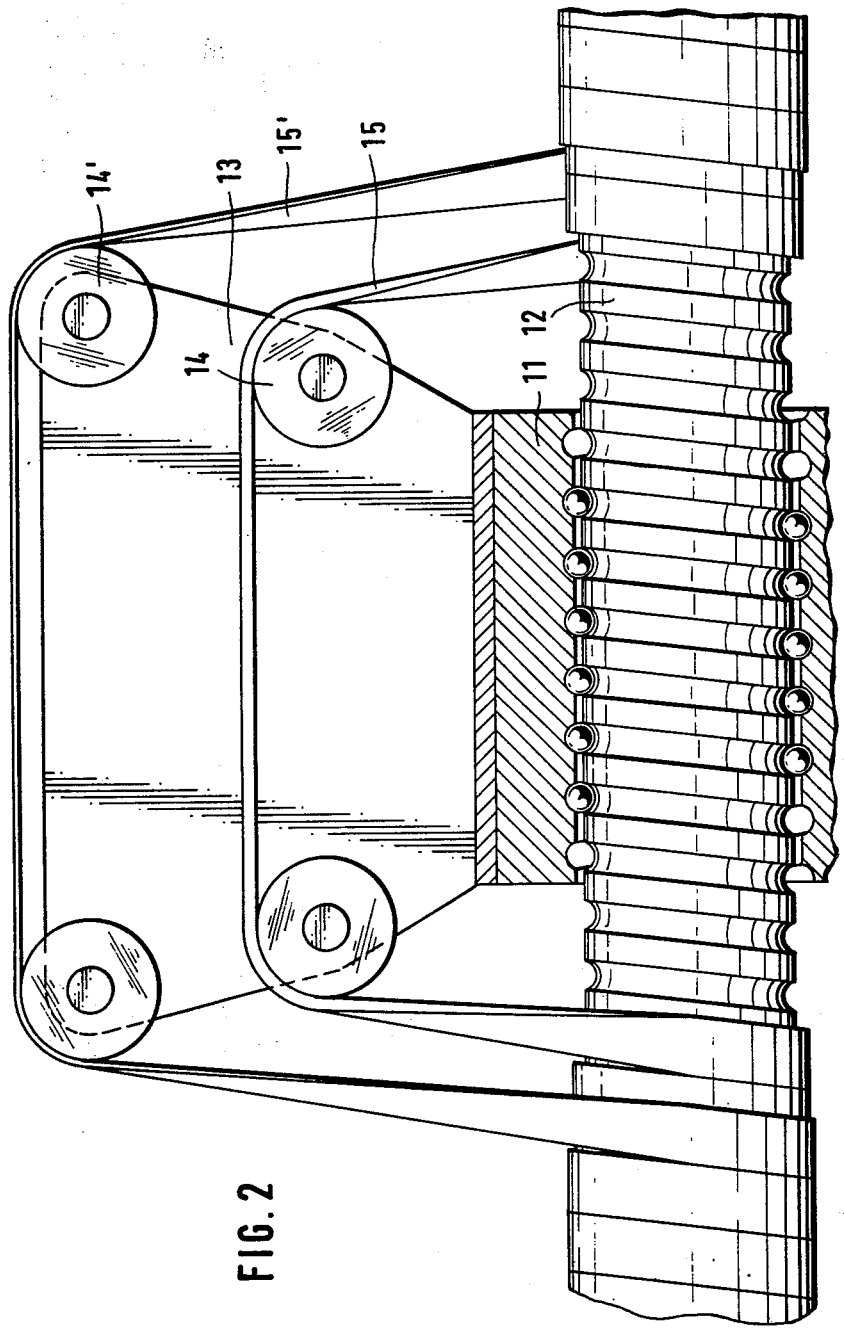
Figure 3:
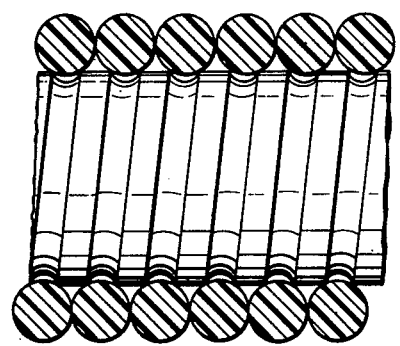
Figure 4:

In order that the invention may be more fully understood, the same will now be described by way of example with reference to the accompanying drawings, in which:

FIG. 1 schematically illustrates one embodiment of the invention,

FIG. 2 similarly illustrates another embodiment of the invention,

FIG. 3 illustrates one cross section suitable for a belt used by the invention, and FIG. 4 illustrates another such cross section.

In FIG. 1 the bed of a lathe is indicated by 10, on which bed a carriage is driven by means of a threaded shaft 12 in a manner known per se. The load bearing part of the carriage is a block 11 having a threaded bore through which the shaft is engaged. The carriage has a hood-shaped covering 18 which in practice forms a casing, and the block carries a mounting 13 within this casing.

The mounting carries two guide rollers 14 and a tensioning device 17 as shown, the device including two further freely rotatable rollers or drums 16. The tensioning device is spring-biassed so that it tends to rotate in a clockwise direction as seen in FIG. 1.

At the one end of the shaft 12, which end is connected to a relatively fixed part of the lathe, a covering belt 15 is fixed directly on to the shaft, the belt being rectangular in cross-section in the simplest case. The belt has a width equal to the pitch of the shaft thread and is wound on to the shaft in edge-to-edge butting manner as shown.

At a point adjacent to the block 11 and inside the casing 18, the belt 15 is passed upwards round the nearer guide roller 14, between the two tensioning rollers 16, over the further guide roller 14, and is then wound on to the shaft again on the other side of the carriage before being fixed to the shaft at its remaining end.

Annular sealing members 19 are provided on both sides of the casing, these members being located around the shaft and having outwardly projecting lips engaging the belt. These members serve to clean the belt as it passes from the shaft when the carriage moves, and they prevent foreign matter entering the casing.

The embodiment of FIG. 2 differs from that of FIG. 1 by the provision of two belts wound one above the other on the shaft. The winding process and the geometry may be seen to be substantially the same, with an additional pair of guide rollers 14' being provided on the mounting 13. Tensioning devices can also be provided but are omitted from FIG. 2 for the sake of clarity.

The inner belt 15 can, for example, be made of a suitable plastics material and the outer belt 15' can be of a thin metal such as steel. The use of metal for the outer belt will serve to protect against hot waste from machining operations, and the use of two belts wound one above the other is clearly more effective than merely having one belt to protect the shaft. As may be seen from FIG. 2, the belts are preferably wound in an offset manner, suitably by half of their width, so that the outer belt covers the abutting edges of the inner belt.

Obviously it is also possible to protect a shaft in the illustrated manner when the shaft does not project, or is not exposed, on both sides of the carriage. In such a case the mounting 13 simply carries a rotary member to serve as a take-up and supply spool for the belt. This member can be spring-loaded or otherwise driven, such as by a motor, to wind up the belt when the carriage moves towards the relatively fixed machine part from which the shaft extends, and to feed out the belt when the carriage moves in the opposite direction. No other changes are necessary.

It is also possible to improve the effectiveness of the invention by appropriate choice of the shape of the belt or belts, and of the materials used therefor.

Thus for example, if only dry foreign matter is to be encountered, it may be preferable to use a belt of circular cross-section, the diameter being such that it seats in the shaft thread while still abutting at successive turns, as shown in FIG. 3. In this case a different arrangement of sealing means may be appropriate, such as one which does not engage around the shaft as is indicated in FIG. 1 but rather engages around the belt between the shaft and the take-up spool.

In some other cases it may be preferred to shape the belt as is shown in FIG. 4. The inner side of this belt is profiled to provide a projection a which seats in the shaft thread. In addition, FIG. 4 can be regarded as showing a composite belt with inner and outer parts for situations such as that of FIG. 1, or two belts for situations such as that of FIG. 2, the inner part or belt being of plastics material, and the outer part or belt b being of metal.

It is also possible to use a flat belt having a width greater than the pitch of the shaft thread whereby successive turns of the belt overlap one another. In this case a lipped sealing means such as that of FIG. 1 may be inappropriate, but a similar means for cleaning the belt can be located elsewhere as mentioned in relation to FIG. 3. Indeed, it should be understood that cleaning of the belt does not necessitate a lipped annular member, but may involve any suitable means. For example, foreign matter can be sucked or blown away, several non-annular wipers can be arranged one behind the other, and so on.

In contrast to the previously proposed protective devices described above, that of the invention is advantageous in that the belt is supported directly by the shaft over any length. Also, it is possible to renew the belt or belts without having to remove the shaft from the machine, since it is only necessary to release the belt at its ends to unwind and replace the same.

It will be understood that the above description of the present invention is suceptible to various modification changes and adaptations.

What is claimed is:

1. A protective device for a threaded shaft driven machine having relatively fixed and movable parts with a threaded shaft extending therebetween and connected thereto in respective rotary and driving engagement, said device comprising a protective belt connected at at least one end to said shaft at a point adjacent said fixed machine part, said belt being wound around and completely enclosing and protecting said shaft excluding the portion of said shaft engaged by said movable machine part, rotary member means mounted on and movable with said movable machine part for supporting said protective belt, said protective belt extending away from said shaft at a point immediately adjacent the shaft engaging portion of said movable machine part and being passed around and supported by said rotary member means for take-up and pay-out to the shaft during rotation thereof dependent upon the direction of rotation.

2. A device according to claim 1 wherein said rotary member means is operable to take-up and pay-out said protective belt around said shaft respectively when said machine movable part moves towards and away from said machine fixed part.

3. A device according to claim 1 wherein said shaft projects on both sides of said movable machine part, and said protective belt extends from the shaft on one side of the movable machine part, is guided over the movable machine part by said rotary member means, is wound over the further part of said shaft extending on the opposite side of said movable machine part, and is connected to the end of said further part of said shaft.

4. A device according to claim 1 further comprising protective housing means mounted on and movable with said movable machine part for enclosing and protecting exposed portions of said shaft not covered by the protective tape and tensioning means mounted on said machine movable part to tension said protective belt in cooperation with said rotary member means.

5. A device according to claim 1 wherein said protective belt is wound around the shaft at the same pitch as the shaft thread.

6. A device according to claim 1 wherein at least the inner surface of said belt relative to said shaft is profiled to seat in the shaft thread.

7. A device according to claim 1 wherein said protective belt is of two-part construction having, relative to said shaft, an inner layer of plastics material and an outer layer of metal.

8. A device according to claim 1 further comprising a second protective belt and further rotary member means arranged in similar manner to the first-mentioned protective belt and rotary member means, and with said second belt wound over said first belt on said shaft.

9. A device according to claim 8 wherein said belts are wound on said shaft in offset manner.

10. A device according to claim 9, wherein said belts are respectively of plastics material and metal.

* * * * *